(12) United States Patent
Izelfanane

(10) Patent No.: US 7,490,001 B2
(45) Date of Patent: Feb. 10, 2009

(54) METHOD FOR CONTROLLING THE OPERATION OF A CYLINDER GROUP FOR AN INTERNAL COMBUSTION ENGINE

(75) Inventor: Said Izelfanane, Houilles (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 286 days.

(21) Appl. No.: 11/568,451

(22) PCT Filed: Apr. 14, 2005

(86) PCT No.: PCT/FR2005/050238

§ 371 (c)(1),
(2), (4) Date: Oct. 27, 2006

(87) PCT Pub. No.: WO2005/113966

PCT Pub. Date: Dec. 1, 2005

(65) Prior Publication Data
US 2008/0040019 A1 Feb. 14, 2008

(30) Foreign Application Priority Data
Apr. 29, 2004 (FR) .................................. 04 50837

(51) Int. Cl.
F02D 28/00 (2006.01)
(52) U.S. Cl. ................................... 701/105; 123/90.15
(58) Field of Classification Search ......... 701/103–105, 701/102; 123/90.15, 90.17, 198 F
See application file for complete search history.

(56) References Cited

U.S. PATENT DOCUMENTS

| | | | |
|---|---|---|---|
| 5,398,502 A * | 3/1995 | Watanabe | ................. 123/90.15 |
| 5,490,486 A | 2/1996 | Diggs | |
| 5,803,040 A | 9/1998 | Biesinger et al. | |
| 6,513,471 B1 * | 2/2003 | Hicks | ....................... 123/90.16 |
| 6,950,739 B2 * | 9/2005 | Matsubara et al. | .......... 701/103 |
| 2003/0172900 A1 | 9/2003 | Boyer et al. | |

FOREIGN PATENT DOCUMENTS

| | | |
|---|---|---|
| DE | 19632651 A1 | 2/1998 |
| FR | 2818693 A | 6/2002 |
| FR | 2837871 A1 | 10/2003 |

OTHER PUBLICATIONS

International Search Report mailed Oct. 13, 2005 in PCT/FR2005/050238.

* cited by examiner

Primary Examiner—Hieu T Vo
(74) Attorney, Agent, or Firm—Nicolas E. Seckel

(57) ABSTRACT

The invention relates to a method for controlling the operation of a cylinder group for an internal combustion engine comprising an intake valve, an exhaust valve, handling members for controlling the opening of valves according to the predetermined conditions of the engine operation for selectively opening or closing said intake and exhaust valves, wherein the closing of the intake and exhaust valves is carried out at two distinct adapted times: for the intake valves, in the middle of a time extending between the theoretical intake valve closing timing of one cylinder and the intake valve opening timing of the other cylinder; for the exhaust valve of the cylinders, in the middle of a time extending between the exhaust valve theoretical closing timing of one cylinder and the exhaust valve opening timing of the other cylinder.

20 Claims, 2 Drawing Sheets

METHOD FOR CONTROLLING THE OPERATION OF A CYLINDER GROUP FOR AN INTERNAL COMBUSTION ENGINE

The present invention concerns a method and a device for controlling the operation of a group of cylinders of a multi-cylinder internal combustion engine. The present invention concerns more particularly the deactivation or activation of the valves of a group of cylinders of an engine.

Internal combustion engines, and in particular engines that equip motor vehicles or trucks are most often solicited only to a fraction of their nominal power. During these phases of operation that do not require delivery of a high torque, the engines face losses due to pumping which affect their efficiency and are at the source of an excessive fuel consumption. These pumping losses correspond to the work that must be performed to suck the air/fuel mixture which is located in the intake collector at a relatively low pressure and introduce it into the combustion chamber during the intake phase.

To reduce these pumping losses, it is known to deactivate a part of these cylinders. The deactivated cylinders have their intake and exhaust valves closed and are thus no longer crossed by a gas flow. These deactivated cylinders generate practically no losses because they operate then like air springs, which alternate compression and decompression phases of the air trapped in these cylinders. Regarding the cylinders which have remained active, they must produce a higher torque, and thus, they require a higher flow of intake air in the collector, which increases the pressure in the distribution frame and thus reduces the pumping losses of the engine.

Deactivation is conventionally performed by an appropriate mechanism that acts on the distribution of the cylinders according to the operating conditions of the engine.

Thus, in the case of a distribution via camshaft and pawls, it is known to act on the hydraulic valve lifters or hydraulic tappets on which extremities of the pawls are supported. The patent FR2837871 illustrates such a device.

A goal of the present invention is to improve further the benefit of cylinder deactivation on the efficiency of engines by proposing an improved method and an improved device for deactivation or activation of the valves.

The method according to the invention concerns the control of the operation of a group of cylinders of an internal combustion engine of the four-stroke, multicylinder type, each of the cylinders of the group cooperating with at least one fuel injector, an intake valve, an exhaust valve, operating members for controlling the opening of the valves according to the development of the cycle, and means driven by an engine control computer according to predetermined operating conditions of said engine to activate or deactivate selectively said intake and exhaust valves.

According to the invention, this method is characterized in that the deactivation of the intake and exhaust valves of the cylinders of said group is performed in the course of a same engine cycle at two distinct, adapted times:
- for the intake valves of these cylinders, at a time coinciding substantially with the middle of the period extending between the theoretical closing time of the intake valve of one of the cylinders and the opening time of the intake valve of another of the cylinders;
- for the exhaust valves of these cylinders, at a time coinciding substantially with the middle of the period extending between the theoretical closing time of the exhaust valve of one of the cylinders and opening time of the exhaust valve of another of the cylinders.

According to another characteristic of the method according to the invention, the reactivation of said intake and exhaust valves is performed in the course of a same engine cycle at two distinct, adapted times:
- for the intake valves of these cylinders, at a time coinciding substantially with the middle of the period extending between the theoretical closing time of the intake valve of one of the cylinders and opening time of the intake valve of another of the cylinders;
- for the exhaust valves of these cylinders, at a time coinciding substantially with the period extending to the theoretical closing time of the exhaust valve of one of the cylinders and opening time of the exhaust valve of another of the cylinders.

According to another characteristic of the method according to the invention, there are two cylinders of said internal combustion engine of the four-stroke, multi-cylinder type whose operation is controlled, and the deactivation or activation of the intake and exhaust valves of the two cylinders is performed sequentially, one group of valves after another.

According to another characteristic of the method according to the invention, the driven means exhibit a delay between their control by the computer and the actual activation or deactivation of the valves and this delay is taken into account to perform the control of said means.

According to another characteristic of the method according to the invention, the value of the delay is mapped as a function of the engine operating point, as well as of the aging of said engine.

According to another characteristic of the method according to the invention, an error value is determined on the measurement of the delay, said error value being preferably mapped as a function of the engine operating point, as well as of the aging of said engine.

According to another characteristic of the method according to the invention, the deactivation or activation of the valves of the cylinders is controlled only if the error value is lower than half the time interval separating the theoretical time:
- for the intake valves: from a time coinciding substantially with the middle of the period extending between the theoretical closing time of the intake valve of one of said cylinders and opening time of the intake valve of another of said cylinders;
- for the exhaust valves: from a time coinciding substantially with the middle of the period extending between the theoretical closing time of the exhaust valve of one of said cylinders and opening time of the exhaust valve of another of said cylinders.

The present invention also concerns a device for implementing the method according to the invention.

According to a characteristic of the device according to the invention, the engine control computer comprises an appropriate program, this program being adapted to perform the control of the means for activating or deactivating the valves of the cylinders so that the deactivation or the activation of the valves of the cylinders is performed, in the course of a running engine cycle:
- for the intake valves of the cylinders, at a time coinciding substantially with the middle of the period extending between the theoretical closing time of the intake valve of one of the cylinders and opening time of the intake valve of another of the cylinders;
- for the exhaust valves of the cylinders, at a time coinciding substantially with the middle of the period extending between the theoretical closing time of the exhaust valve of one of the cylinders and opening time of the exhaust valve of another of the cylinders.

According to another characteristic of the device according to the invention, the driven means comprise disengageable hydraulic tappets interposed between said valves and said control members and two hydraulic circuits controlled each by an electrovalve controlled by the engine control computer.

According to another characteristic of the device according to the invention, the driven means comprise electromechanical actuators controlling the opening of the valves.

The present invention and its advantages will be better understood by studying the detailed description of a non-limitative exemplary embodiment illustrated in the annexed drawings, in which.

Figure 1:
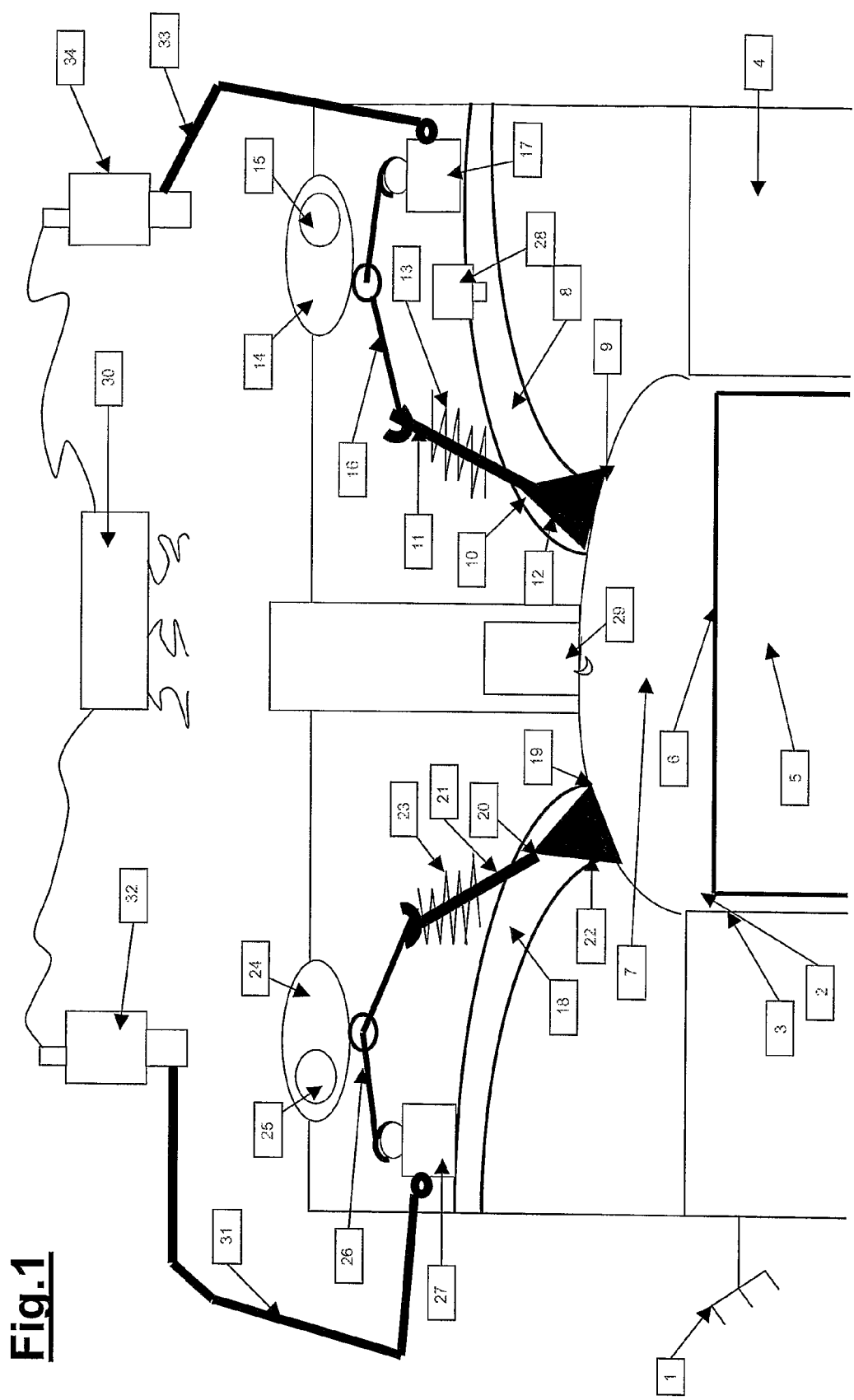
FIG. 1 is a schematic and partial cross-section view of a combustion engine for implementing the method according to the invention.

Referring to FIG. 1, this figure shows a four-stroke, controlled ignition engine, identified by 1, which is intended in particular to equip a motor vehicle. This engine 1 implementing the method for disconnecting cylinders according to the present invention, comprises classically four cylinders in line identified respectively by C1, C2, C3, and C4. Only cylinder C2 has been shown in details.

Cylinder C2 has a bore 3 provided in a cylinder casing block 2. This bore 3 is closed at its upper extremity by a cylinder head 4 placed on top of said casing block 2. A piston 5 is slidingly mounted in the bore 3 of the cylinder 2. This piston is connected via a connecting rod, not shown, to a crankshaft, also not shown. The upper surface 6 of the piston 5, the upper portion of the bore 3, and the facing lower surface of the cylinder head 4 define the combustion chamber 7.

The cylinder head 4 comprises an intake circuit for intake gas formed by at least one conduit 8. This conduit 8 opens into the roof of the chamber 7 by an opening 9 cooperating with a control valve 10 adapted to be actuated between a closed position closing the opening 9 and an opening position for gas intake. The valve 10 comprises a control rod 11 and a closing head 12 having a frustoconical shape, whose inclined peripheral surface comes in contact with a corresponding surface of the opening 9 forming valve seat to close the opening 9.

The opening of the valve 10 is performed against the valve spring 13 by a cam 14 carried by a camshaft 15 via a pivoting lever 16, also called pawl. This pawl is supported, on the one hand, on the extremity of the valve rod 11, and on the other hand, on a hydraulic valve lifter or tappet 17. The tappet 17 is used normally as pivoting point for the pawl and for play compensation.

The cylinder head 4 also comprises an exhaust circuit of burned gases formed by at least one exhaust conduit 18 opening into the roof of the chamber 7 by an opening 19 adapted to be closed by a control valve 20 comprising an actuating rod 21 and a closing head 22.

In a manner similar to the intake, the opening of the valve 20 is performed against the valve spring 23 by a cam 24 carried by a camshaft 25 via a pawl 26. This pawl is supported, on the one hand, on the extremity of the valve rod 21, and on the other hand, on a valve lifter or tappet 27 similar to the tappet 17.

The cylinder head 4 comprises fuel injection means formed by a driven injector 28 receiving fuel at an outside inlet at an appropriate pressure, and having an extremity forming the injection nozzle opening into the intake circuit of the cylinder C2, upstream of the valve 10. The cylinder head 4 also comprises a spark plug 29.

The control of the injector 28, with respect to the injection time and with respect to the amount of fuel injected, is performed by an engine control computer 30 from appropriate data such as the engine speed, the load, and the position of the piston 5 in the cylinder 3 provided by a crankshaft position sensor, not shown.

The computer 30 also drives the ignition time of the spark plug 29 according to the operating point of the engine.

Classically, the order of injection and ignition of the cylinders is as follows; C1, C3, C4, C2. An aim of this ignition order, which is the order in which the cylinders are ignited successively, is to promote balancing of the mobile equipment, not shown, composed of the crankshaft, the connecting rods, and the pistons.

According to the invention, the engine 1 is equipped with a disconnection mechanism for the cylinders intended to reduce pumping losses during some operating phases, and in particular during operation with partial load.

An aim of this disconnection mechanism, also driven by the engine control computer 30, is, when the engine operates in predetermined conditions, to disconnect (i.e., to not let operate) two cylinders out of four, and thus, to let the engine operate on only two cylinders. The disconnection of the cylinders is performed by the deactivation of the gas intake and exhaust valves.

To reduce problems of dilatation of the cylinder head and engine block due to the cooling generated by an operation reduced to two cylinders, the intermediary cylinders C3 and C2 are deactivated, whereas the end cylinders C1 and C4 remain active. This mechanism performs naturally the reconnection of the deactivated cylinders, as soon as the operation of the engine leaves the predetermined operating phases mentioned above.

The disconnection mechanism illustrated as a non-limitative example uses hydraulic tappets 17 and 27 adapted to be disengaged, and thus, to deactivate the valves, i.e., to immobilize the latter on their seats in closed position, and this, for any position of the camshaft.

This type of disengageable hydraulic tappets operates according to two modes: a first mode in which the tappet is locked in position in the cylinder head 4 and is then used as a pivoting point for the corresponding pawl, and a second mode where the tappet is mobile in its housing and where the pivoting point of the pawl, under the action of the associated cam, becomes the extremity of the valve rod, which then remains immobilized on its seat.

The locking and unlocking operations of the tappets 17 and 27 are, according to the illustrated exemplary embodiment, performed via two pressurized hydraulic circuits: a circuit 31 controlling the tappet 27 and a circuit 33 controlling the tappet 17. These circuits 31 and 33 are controlled by electrovalves 32 and 34, respectively.

Classically, when the valve associated to one or the other of the tappets 17, 27 is in opening phase, the unlocking control of the corresponding tappet is then inoperative, the unlocking of a tappet is performed only when the associated valve is placed on its seat.

The circuits 31 and 33 control, not only the exhaust valve 20 and the intake valve 10, respectively, of the cylinder No. 2 C2, but also the corresponding valves of the cylinder No. 3, C3.

Such tappets are known in themselves and will not be described in details further. One can refer, for example, to document FR2837871 which describes an embodiment of such disengageable tappets.

According to the illustrated embodiment of the deactivation device, the deactivation of the exhaust valves of the cylinders C2 and C3 is thus performed by the hydraulic circuit 31 controlled by the driven electrovalve 32, also called EVE, whereas the deactivation of the intake valve of the cylinders C3 and C2 is performed by the other, distinct hydraulic circuit 31 controlled by a second driven electrovalve 32, also called EVI.

Figure 2:
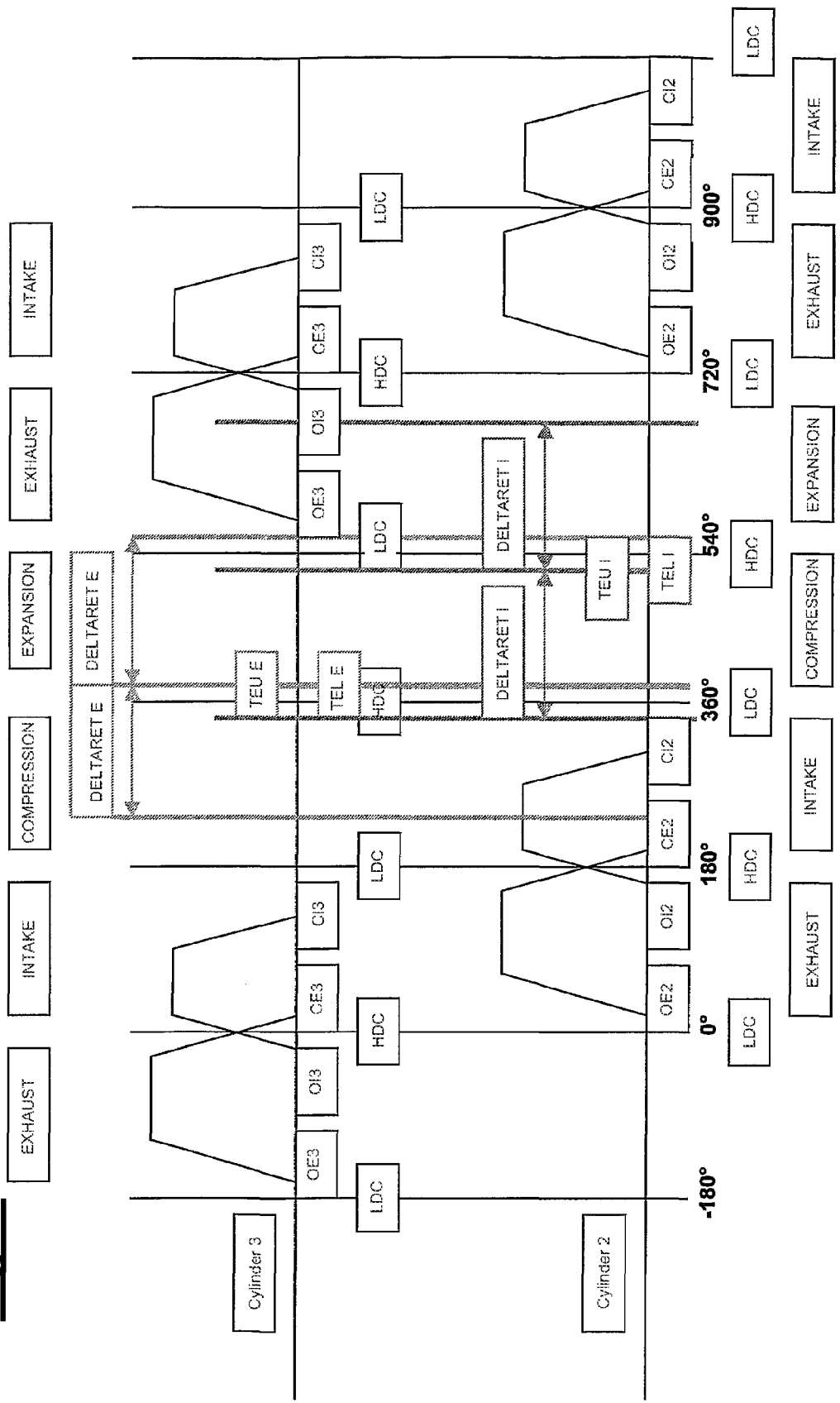
FIG. 2 shows a chronogram detailing the process according to the invention.

Referring to FIG. 2, this figure shows the chronogram of the process of controlling the valves of the cylinders C2 and C3, which is useful for understanding the deactivation method according to the invention.

The chronogram describes the control of the valves when they are in service during the course of an engine cycle in the cylinders C2 and C3, half-revolution of the crankshaft after half-revolution of the crankshaft. A cycle extends over two revolutions of the crankshaft, i.e., 720° crankshaft. For ease of reference, all the times will be identified in the form of values of crankshaft angle.

Shortly before the high dead center HDC for C2 (180°) starting a new four-stroke cycle, the intake valve 10 opens at time OI2, whereas the exhaust valve 20 is itself still open. Shortly before this crossing HDC (180°), the exhaust valve closes at time CE2, and, the intake valve being open, the piston going down can suck in fresh gases. This first "intake" period lasts practically until after the low dead center LDC (360°) where the closing of the intake valve 10 is performed at time CI2.

The two following periods, "compression" and "combustion/expansion," respectively, then follow the "intake" period. The "compression" period accompanies the piston going up until ignition HDC (540°) whereas the "expansion" period, the driving period of the cycle, corresponds to the piston going down until the LDC (720°).

In the vicinity of the low dead center LDC (720°), the exhaust valve opens at time OE2. During the "exhaust" period, the piston 5 going up to the HDC (900°) ensures the quasi-complete elimination of the combustion gases from the combustion chamber 7. Then the cycle starts again with a new "intake" phase, etc.

In the case where the engine is equipped with a variable distribution system with phase shifter or other mechanism making it possible to vary the rising times, then the times OE2, CE2, OI2, CI2 vary as a function of the operating conditions of the engine 1 and in particular the engine speed and load conditions, and this, just like the ignition time IG of the spark plug 29, which takes place in the vicinity of the HDC, toward the end of the compression period.

In accordance with the invention, the method of deactivation of the valves is adapted to implement the trapping of burned gases in the chamber 7 when the cylinder C2 is located at the LDC. To this effect, the disengagement of the tappets 17 and 27 must be performed before the "exhaust" phase of a running cycle, i.e., after the start of the intake phase OI2 of the fuel mixture and before the start OE2 of the opening of the exhaust valves.

Indeed, the applicant has shown that the presence of hot burned gases in the disconnected cylinders makes it possible to reduce considerably the acyclism of the engine, and this, with respect to deactivated cylinders filled with fresh air or empty.

According to the invention, the theoretical effective unlocking time TEU E of the tappet 17 and TEU I of the tappet 27 is thus determined as being respectively substantially the middle of the interval separating the theoretical times CE2 and OE3 and substantially the middle of the interval separating the successive theoretical times CI2 and OI3 corresponding to the operating point under consideration, i.e., respectively: (CE2−OE3)/2 and (CI2−OI3)/2, i.e., respectively, substantially at the HDC of the compression of the cylinder 3 and at the HDC of the compression of the cylinder 2.

Taking into account the response time RET I of the hydraulic circuit 31 and of the valve EVI and of RET E of the hydraulic circuit 33 and the electrovalve EVE, the computer 30 must anticipate the time TEU E and TEU I and thus trigger the control of the valve EVI and EVE at a time TI and TE, such that TI+RET I is equal to TEU I and TE+RET E is equal to TEU E.

The response time RET of the hydraulic circuit 31 and of the valve EV2 is mapped according to the operating conditions of the engine, and in particular the pressure and engine speed parameters, as well as, in particular, the aging of the parts of the hydraulic circuit.

Taking into account the manufacturing tolerances and the aging of the parts, the determination of the time RET comprises a tolerance, which tolerance can itself be estimated by a value DeltaRET. Thus, when the computer triggers the unlocking at time T (TEU−RET), the actual effective unlocking takes place within the time period: (TEU−DeltaRET; TEU+DeltaRET).

The response time RET I of the hydraulic circuit 31 and of the valve EVI and RET E of the valve EV2 and the valve EVE, is mapped according to the operating conditions of the engine, and in particular the pressure and engine speed parameters, as well as, in particular, the aging of the parts of the hydraulic circuit.

Taking into account the manufacturing tolerances and the aging of the parts, the determination of the time RET I and RET E comprises a tolerance, which tolerance can itself be estimated by a value DeltaRET I and DeltaRET E. Thus, in the generic case, when the computer triggers the unlocking at time T (TEU−TEL), the actual effective unlocking takes place within the time period: (TEU−DeltaRET; TEU+DeltaRET).

Taking into account the above, i.e., that the actual effective unlocking takes place inside the phase (CE2; OE3) and (CI2; OI3), it is thus important that the hydraulic circuit be dimensioned to respond to a DeltaRET I and DeltaRET E much lower than 180° crankshaft angle, which corresponds to 10 ms at a speed of 3,000 revs/min and to 20 ms at 1,500 revs/min. Conversely, if it is not possible to maintain in all the disconnection phases a value of DeltaRET I and DeltaRET E well below 180° crankshaft, then the disconnection is no longer performed in the initial phases, but only those that make it possible to ensure a value DeltaRET I and DeltaRET E below 180°.

The mapping used by the engine control computer 30 thus takes into account all these different values to perform the control of the disconnection of the cylinders C2 and C3.

The management of the reactivation of the valves is substantially similar. Indeed, it is appropriate to proceed first to the evacuation of the burned gases before admitting again a fuel mixture or air, and thus, so as not to evacuate too much burned gases during intake. To this effect, the exhaust must be opened before the intake.

In accordance with the invention, the theoretical effective locking time TEL I and TEL E, respectively, of the tappets 17 and 27 is thus determined as being substantially in the middle of the interval separating the times CI2 and OI3 and the times CE2 and OE3, i.e., substantially at the compression HDC of the cylinders 2 and 3, i.e., also, in the vicinity of 540° and 360° crankshaft angle.

The reactivation of the valves is thus driven by the engine control computer in the same way as the deactivation of these valves. What has been described above regarding the control of the driven electrovalve applies in a perfectly similar manner and will not be detailed further. However, it must be noted that it will be advisable to take into account a delay value specific to the reactivation, distinct from the value corresponding to the deactivation.

Of course, the present invention is not limited to the embodiment just described, and it is possible to provide many changes and modifications without leaving the scope of the present invention.

Thus, the present invention also applies to engines having electromagnetic distributions. In that case, the actuators controlling the valves are controlled so as to deactivate the valves of the cylinders to be deactivated.

Thus, the present invention applies for any number of cylinders in the engine (four, five, six, seven, eight, etc.) and for any number of cylinders to be disconnected (one, two, three, four, etc.)

The invention claimed is:

1. Method of controlling the operation of a group of cylinders of an internal combustion engine of the four-stroke, multicylinder type, each of the cylinders of said group cooperating with at least one fuel injector, an intake valve, an exhaust valve, operating members for controlling the opening of the valves according to the development of the cycle and means driven by an engine control computer according to predetermined operating conditions of said engine to activate or deactivate selectively said intake and exhaust valves, wherein the deactivation of said intake and exhaust valves of said cylinders is performed in the course of a same engine cycle at two distinct, adapted times:

for the intake valves of said cylinders, at a time coinciding substantially with the middle of the period extending between the theoretical closing time of the intake valve of one of said cylinders and opening time of the intake valve of another of said cylinders;

for the exhaust valves of said cylinders, to a time coinciding substantially with the middle of the period extending between the theoretical closing time of the exhaust valve of one of said cylinders and opening time of the exhaust valve of another of said cylinders.

2. Method according to claim 1, wherein the reactivation of said intake and exhaust valves is performed in the course of a same engine cycle at two distinct, adapted times:

for the intake valves, at a time coinciding substantially with the middle of the period extending between the theoretical closing time of the intake valve of one of said cylinders and opening time of the intake valve of another of said cylinders;

for the exhaust valves, to a time coinciding substantially with the period extending to the theoretical closing time of the exhaust valve of one of said cylinders and opening time of the exhaust valve of another of said cylinders.

3. Method according to claim 2, wherein there are two cylinders of said internal combustion engine of the four-stroke, multi-cylinder type whose operation is controlled, and the deactivation or activation of the intake and exhaust valves of the two cylinders is performed sequentially, one group of valves after another.

4. Method according to claim 2, wherein said driven means exhibit a delay between their control by said computer and the actual activation or deactivation of the valves, and this delay is taken into account to perform the control of said means.

5. Method according to claim 4, wherein the value of said delay is mapped as a function of the engine operating point, as well as of the aging of said engine.

6. Method according to claim 5, wherein an error value is determined on the measurement of said delay.

7. Method according to claim 6, wherein the error value is mapped as a function of the engine operating point, as well as of the aging of said engine.

8. Method according to claim 4, wherein an error value is determined on the measurement of said delay.

9. Method according to claim 8, wherein the error value is mapped as a function of the engine operating point, as well as of the aging of said engine.

10. Method according to claim 1, wherein there are two cylinders of said internal combustion engine of the four-stroke, multi-cylinder type whose operation is controlled, and the deactivation or activation of the intake and exhaust valves of the two cylinders is performed sequentially, one group of valves after another.

11. Method according to claim 1, wherein said driven means exhibit a delay between their control by said computer and the actual activation or deactivation of the valves, and this delay is taken into account to perform the control of said means.

12. Method according to claim 11, wherein the value of said delay is mapped as a function of the engine operating point, as well as of the aging of said engine.

13. Method according to claim 12, wherein an error value is determined on the measurement of said delay.

14. Method according to claim 11, wherein an error value is determined on the measurement of said delay.

15. Method according to claim 14, wherein the deactivation or activation of said valves of said cylinders is controlled only if the error value is lower than half the time interval separating the theoretical time:

for the intake valves: from a time coinciding substantially with the middle of the period extending between the theoretical closing time of the intake valve of one of said cylinders and opening time of the intake valve of another of said cylinders;

for the exhaust valves: from a time coinciding substantially with the middle of the period extending between the theoretical closing time of the exhaust valve of one of said cylinders and opening time of the exhaust valve of another of said cylinders.

16. Method according to claim 14, wherein the error value is mapped as a function of the engine operating point, as well as of the aging of said engine.

17. Method according to claim 11, wherein the error value is mapped as a function of the engine operating point, as well as of the aging of said engine.

18. Device for implementing the method according to claim 1, characterized in that said engine control computer comprises an appropriate program, this program being adapted to perform the control of said means for activating or deactivating the valves of said cylinders so that the deactivation or the activation of the valves of said cylinders is performed, in the course of a running engine cycle:

for the intake valves of the cylinders, at a time coinciding substantially with the middle of the period extending between the theoretical closing time of the intake valve of one of said cylinders and opening time of the intake valve of another of said cylinders;

for the exhaust valves of the cylinders, at a time coinciding substantially with the middle of the period extending between the theoretical closing time of the exhaust valve of one of said cylinders and opening time of the exhaust valve of another of said cylinders.

19. Device according to claim 18, wherein said driven means comprise disengageable hydraulic tappets interposed between said valves and said control members and two hydraulic circuits controlled each by an electrovalve controlled by the engine control computer.

20. Device according to claim 18, wherein said driven means comprise electromechanical actuators controlling the opening of the valves.

* * * * *